United States Patent

Hong et al.

[11] Patent Number: 5,944,830
[45] Date of Patent: Aug. 31, 1999

[54] REDUCING POWER CONSUMPTION IN MONITOR BY SWITCHING OFF HEATER POWER IN POWER-OFF MODE

[75] Inventors: Seung-Cheol Hong; Ki-Young Jang, both of Suwon, Rep. of Korea

[73] Assignee: SamSung Electronics Co., Ltd., Kyungki-do, Rep. of Korea

[21] Appl. No.: 08/814,502

[22] Filed: Mar. 10, 1997

[30] Foreign Application Priority Data

Mar. 8, 1996 [KR] Rep. of Korea ........................ 96-4299
Mar. 8, 1996 [KR] Rep. of Korea ........................ 96-6135

[51] Int. Cl.⁶ ........................................... G06F 1/32
[52] U.S. Cl. .................... 713/324; 713/320; 345/211; 345/212
[58] Field of Search ................ 395/750.01; 315/411; 330/273; 363/97, 21, 127; 327/41; 345/210, 211, 212; 713/320, 324

[56] References Cited

U.S. PATENT DOCUMENTS

| | | |
|---|---|---|
| 4,629,941 | 12/1986 | Ellis et al. ........................... 315/153 |
| 4,866,585 | 9/1989 | Das ...................................... 363/8 |
| 5,065,357 | 11/1991 | Shiraishi et al. . |
| 5,375,245 | 12/1994 | Solhjell et al. . |
| 5,389,952 | 2/1995 | Kikinis . |
| 5,465,366 | 11/1995 | Heineman . |
| 5,481,299 | 1/1996 | Coffey et al. . |
| 5,481,732 | 1/1996 | Shahbazi . |
| 5,548,764 | 8/1996 | Duley et al. . |
| 5,555,032 | 9/1996 | Kung . |
| 5,576,738 | 11/1996 | Anwyl et al. . |
| 5,579,252 | 11/1996 | Huang . |
| 5,675,485 | 10/1997 | Seong ................................... 363/97 |
| 5,726,871 | 3/1998 | Choi ..................................... 363/89 |
| 5,736,873 | 4/1998 | Hwang ................................. 327/41 |

*Primary Examiner*—Ayaz R. Sheikh
*Assistant Examiner*—Rupal D. Dharia
*Attorney, Agent, or Firm*—Robert E. Bushnell, Esq.

[57] ABSTRACT

An apparatus for controlling the power management of a display monitor includes: a switching circuit provided in a power supply line between one output of a power supplying transformer and a heater of a color display tube for directly switching off the power supply line when the monitor enters the power-off mode. Also, a mode indicator may also be provided for indicating the power-off mode of the monitor. A microcomputer operates in response to the power-off mode to generate a high-level control signal supplied to the switching circuit and to the mode indicator. Also, a continuous pulse train signal having a predetermined on/off pulse duration is generated, representing the power-off mode. When both a high level control signal and the pulse train signal are supplied to the mode indicator, a power-off mode indicating operation using one LED is possible.

10 Claims, 4 Drawing Sheets

REDUCING POWER CONSUMPTION IN MONITOR BY SWITCHING OFF HEATER POWER IN POWER-OFF MODE

CLAIM OF PRIORITY

This application makes claims all benefits accruing under 35 U.S.C. §119 from an application for *POWER MANAGEMENT CONTROL APPARATUS FOR MONITOR* earlier filed in the Korean Industrial Property Office on Mar. 8, 1996 and there duly assigned Ser. No. 6135/1996 and for *POWER MANAGEMENT CONTROL APPARATUS FOR MONITOR* earlier filed in the Korean Industrial Property Office on Mar. 8, 1996 and there duly assigned Ser. No. 4299/1996.

BACKGROUND OF THE INVENTION

1. Field of the Invention

The present invention relates to computer monitors, and more particularly to an apparatus for controlling the power management of a display monitor that operates to reduce power consumption of the monitor as well as to indicate its corresponding operating mode.

2. Description of the Related Art

Generally, a monitor for a computer system displays information or images on its screen according to signals supplied by the video output of the computer. The supplied video signals include a color picture signal (R,G,B) and a horizontal synchronization signal (HSYNC) and a vertical synchronization signal (VSYNC). According to the DPMS (Display Power Management Signaling) system established by the Video Electronics Standard Association (VESA), the HSYNC and VSYNC signals are not supplied to the monitor when the computer is in an inactive state for a predetermined time followed by the suspend mode and stand-by mode time intervals. In this case, the monitor enters the power-off mode that will reduce the electrical power consumed by the monitor to below five watts.

An earlier power management control apparatus includes a power supplying section and a microcomputer based controlling section. The power supplying section includes a power supply unit for converting an AC input to a DC output, a voltage regulator for generating a constant output voltage, a transformer for generating necessary operating voltages for each part of the monitor, and first and second auxiliary power supplying units coupled to the secondary of the transformer for generating backup voltages.

Also, the controlling section includes a signal input port connected to the video output of the computer, a microcomputer operated in response to the video input signal to produce a power control signal and a mode indicating signal, a feedback circuit provided between the output of the transformer and the regulator, and a mode indicator for indicating the operating mode of the monitor.

In this arrangement, the regulator regulates the output voltage from the power supply depending on the feedback current fed from the secondary of the transformer through the feedback circuit. When the sync signals are not supplied to the video input port and the monitor is in the power-off mode, the power control signal generated by the microcomputer is supplied to the feedback circuit to control the amount of feedback current supplied to the regulator. Then, the regulator lowers the output voltage supplied to the transformer which also lowers all of the output voltages produced at the secondary of the transformer.

With this, the power supplied to the heater of the cathode ray tube or color display tube is lowered, thus reducing the power consumption in the monitor as required in the power-off mode.

Also, the video signal received at the input port is amplified by a signal amplifier and the processed signal is supplied to the signal input of the color display tube. The mode indicator indicates each operating mode, that is, standby, suspend, ON and OFF modes, via two different colored light emitting diodes in response to the mode indicating signal generated by the microcomputer. Normally, one green light emitting diode light being on corresponds to the normal ON mode, one orange light emitting diode light being on corresponds to the standby mode, and both the green and orange light emitting diodes toggle on and off alternately in the suspend mode, and only the orange light emitting diode toggles on and off in the OFF mode.

The above noted apparatus has shortcomings in that first and second auxiliary power supplying units are needed in order to produce the backup voltages supplied to the regulator and the microcomputer when the output voltages produced by the secondary of the transformer are lowered in the power-off mode.

The provision of the first and second auxiliary power supplying units is difficult since they are operated with the power transformer. Thus, securing reliability of each auxiliary power supplying unit is difficult and providing the auxiliary power supplying units in the power management apparatus results in an increase in the manufacturing cost.

The following patents each disclose features in common with the present invention but nevertheless do not teach or suggest the specifically recited combination of features of the present invention:

U.S. Pat. No. 5,579,252 to Huang, entitled *Computer Monitor Power-Saving Device*, U.S. Pat. No. 5,576,738 to Anwyl et al., entitled *Display Apparatus With Means For Detecting Changes In Input Video*, U.S. Pat. No. 5,555,032 to Kung, entitled *Integrated Circuit For Economizing Power Consumption Of A Monitor By Using Two Reference Values For Discriminating The Input Signal*, U.S. Pat. No. 5,548,764 to Duley et al., entitled *Power Interrupt Device With Remote Activity Detector*, U.S. Pat. No. 5,481,732 to Shahbazi, entitled *CRT Monitor Power Control Unit*, U.S. Pat. No. 5,481,299 to Coffey et al., entitled *Power Saving Device For Video Screen*, U.S. Pat. No. 5,465,366 to Heineman, entitled *Power Control Module For Computer Monitors*, U.S. Pat. No. 5,389,952 to Kikinis, entitled *Low-Power-Consumption Monitor Standby system*, U.S. Pat. No. 5,375,245 to Solhj ell et al., entitled *Apparatus For Automatically Reducing The Power Consumption Of A CRT Computer Monitor*, and U.S. Pat. No. 5,065,357 to Shiraishi et al, entitled *Data Processing Machine With Liquid Crystal Display And Control Means For Regulating Backlighting To The Display*.

SUMMARY OF THE INVENTION

It is therefore an object of the present invention to provide an apparatus for controlling the power management of a display monitor that simplifies the configuration of a power supplying section and manages to reduce the power consumption of a color display tube according to the power-off mode of the DPMS system and to indicate its operating mode in a more effective manner.

According to the present invention, there is provided an apparatus for controlling the power management of a display monitor may be constructed with a power supply unit for converting an AC input voltage into a DC output voltage; a voltage regulator for producing a constant output voltage supplied to the monitor; a transformer for producing necessary operating voltages for each part of the monitor, the output voltage of the voltage regulator being supplied to a primary of the transformer; a feedback circuit for detecting current variation at the output of the transformer and for supplying the detected variation value to the voltage regulator, a switching circuit provided in a power supply line between one output of the transformer and a heater of a color display tube for switching off the power supply line when the monitor enters a power-off mode; a microcomputer operated in response to a video signal received at a video input port of the monitor to produce a power control signal and a corresponding control mode indicating signal; a mode indicator for indicating the power control mode of the monitor in response to the power control signal and the mode indicating signal; a signal input port connected to a video output of a computer; and a signal amplifier for amplifying and processing a video input signal supplied to a signal input of the color display tube.

According to a preferred embodiment of the present invention, the switching circuit may be constructed with a first transistor for switching on or off the power supply line between one output of the transformer and the heater of the color display tube in response to a base bias current supplied from said output of the transformer; a second transistor for selectively switching a base bias current path of the first transistor to ground; and a third transistor for selectively switching an operating voltage supply line to the base bias resistor of the second transistor or ground in response to the level of the power control signal supplied from a microcomputer.

Preferably, the microcomputer generates a continuous high level signal as the power control signal when the monitor enters the power-off mode.

Further, in accordance with the preferred embodiment of the invention, the mode indicator may be constructed with a first voltage supply for operating a first light emitting diode (LED); a second voltage supply for operating a second LED; a first switching transistor operated in response to the mode indicating signal generated by the microcomputer for switching on or off a first voltage supply line including the first LED to ground; and a second switching transistor operated in response to the power control signal generated by the microcomputer for switching a second voltage supply line to ground; said second voltage supply being connected to the first voltage supply through a series combination of a diode and the second LED and the first voltage being lower than the second voltage.

According to the present invention, the power controlling section is operated independently of the power supplying section. That is, when the monitor is operated in the power-off mode of the DPMS system, the power control signal generated by the microcomputer enables the switching circuit directly to cut off the power supply line from the output of the power supplying section to the heater of the color display tube. Also, the power control signal that is switching off the power supply line enables the mode indicator to display the power-off mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
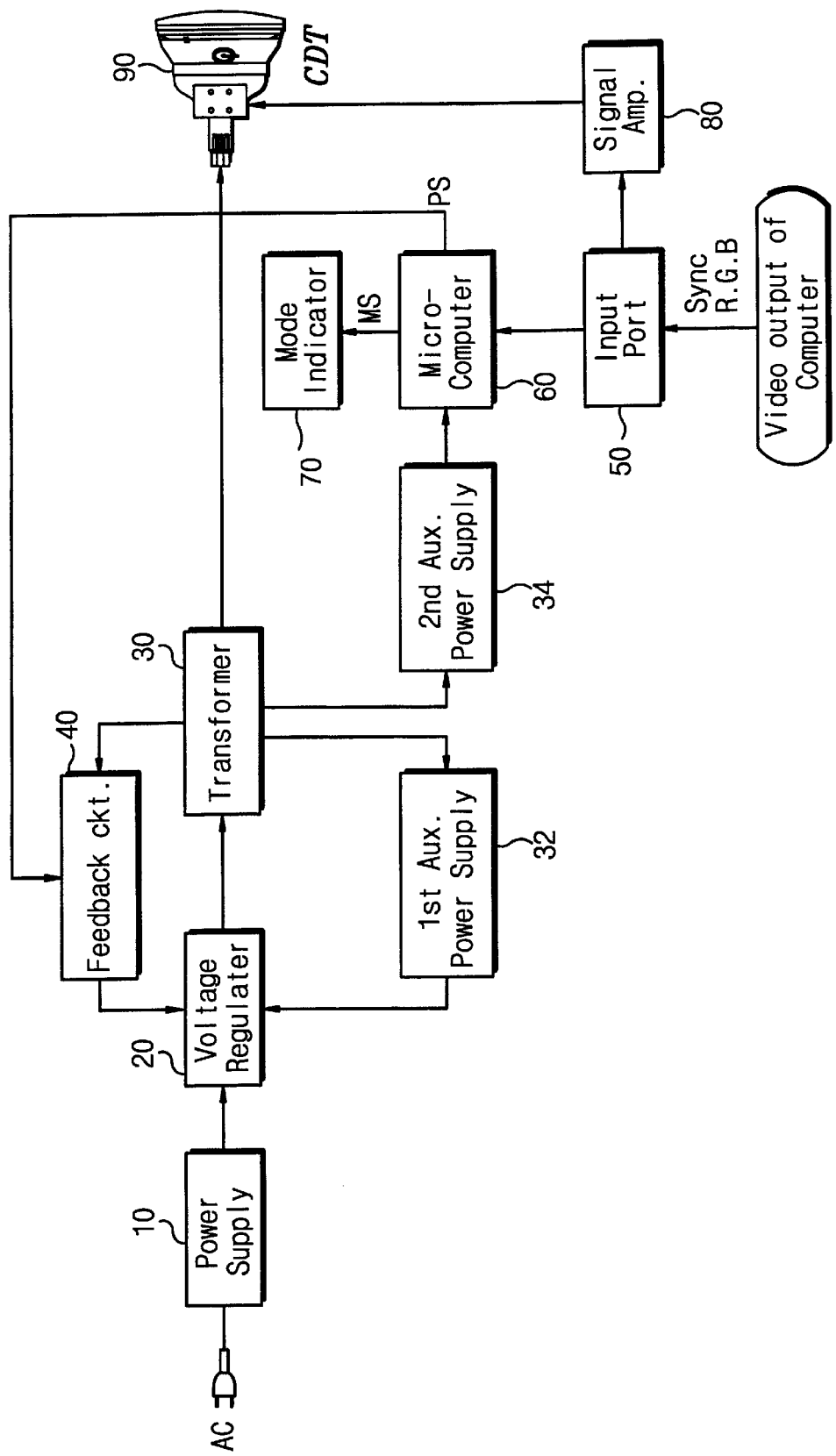
FIG. 1 is a block circuit diagram of an apparatus for controlling power management of display monitors.

An earlier power management control apparatus is shown in FIG. 1, for example. Briefly, the power management control system includes a power supplying section and a microcomputer based controlling section. The power supplying section includes a power supply unit 10 for converting an AC input to a DC output voltage, a voltage regulator 20 for generating a constant output voltage, a transformer 30 for generating necessary operating voltages for each part of the monitor, and first and second auxiliary power supplying units 32 and 34 coupled to the transformer secondary for generating backup voltages.

Also, the controlling section includes a signal input port 50 connected to the video output of the computer, a microcomputer 60 operated in response to the video input signal to produce a power control signal PS and a mode indicating signal MS, a feedback circuit 40 provided between the output of the transformer 30 and the regulator 20, and a mode indicator 70 for indicating the operating mode of the monitor according to the DPMS system.

In this arrangement, the regulator 20 regulates the output voltage from the power supply 10 depending on the feedback current fed from the secondary of the transformer 30 through the feedback circuit 40. Furthermore, when the HSYNC and VSYNC signals are not supplied to the video input port 50 and the monitor is in the power-off mode, the power control signal PS generated at one output of the microcomputer 60 is supplied to the feedback circuit 40 to control the amount of feedback current supplied to the regulator 20. Then, the regulator 20 lowers the output voltage supplied to the transformer 30, and also this lowers all of the output voltages produced at the secondary of the transformer 30.

With this, the power supplied to the heater of a cathode ray tube or color display tube (CDT) 90 is lowered, thus reducing the power consumption in the monitor as required in the power-off mode of the DPMS system.

Also, the video signal received at the input port 50 is amplified by a signal amplifier 80 and the processed signal is supplied to the signal input of the color display tube. The mode indicator 70 indicates each operating mode of the DPMS system, that is, the ON, standby, suspend, and OFF modes, via two different-colored light emitting diodes (LEDs), not shown, in response to the mode indicating signal MS generated by the microcomputer 60. According to the standard LED display mode established by VESA, one green LED light being on corresponds to the normal ON mode, one orange LED light being on corresponds to the standby mode, both the green and orange LEDs toggle on and off alternately in the suspend mode, and only the orange LED toggles on and off in the OFF mode.

However, the above arrangement has the shortcomings of adding a first auxiliary power supplying unit 32 and a second auxiliary power supplying unit 34 in order to produce the backup voltages respectively supplied to the regulator 20 and the microcomputer 60, when the output voltages produced by the secondary of the transformer 30 are lowered in the power-off mode.

The provision of the first and second auxiliary power supplying units 32 and 34 is difficult since they are operated with the power transformer 30 according to the DPMS operation. Thus, securing reliability of each auxiliary power supplying unit is difficult, and providing the auxiliary power supplying units in the power management apparatus results in an increase in the manufacturing cost.

Figure 2:
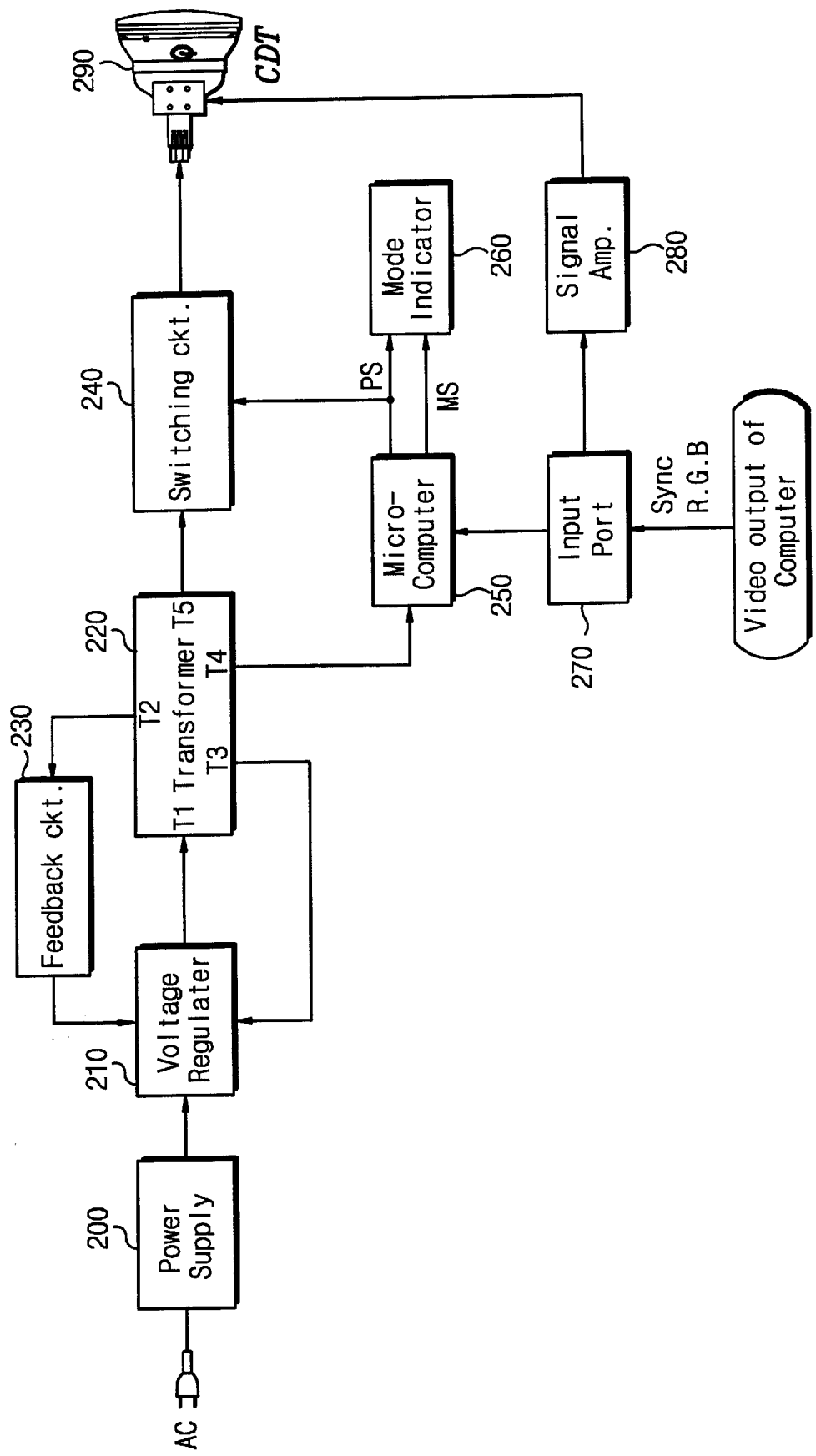
FIG. 2 is a block circuit diagram of an apparatus for controlling power management of monitors according to the present invention.

FIG. 2 illustrates an apparatus for controlling the power management of a display monitor according to this invention. The apparatus of FIG. 2 is similar to that of shown in FIG. 1 in that the apparatus has the power supplying section and the power controlling section. However, the power controlling section of the present invention is configured such that in response to the power-off signal generated by the microcomputer it directly cuts off the supply of power directed to the heater of the color display tube, instead of lowering all output power being produced in the power supplying section. Also, the power supplying section of the present invention is not provided with auxiliary power supplying units for generating back up voltages for the regulator and the microcomputer.

As shown in FIG. 2, the apparatus for controlling the power management of a display monitor according to the present invention comprises a power supply unit 200 for converting an AC input to a DC output voltage, and a voltage regulator 210 receiving the DC output voltage of the power supply unit 200 and for generating a constant output voltage. The output of the regulator 210 is connected to a primary terminal T1 of a transformer 220 to produce the necessary operating voltages at the secondary thereof In turn, one terminal T2 of the secondary of the transformer 220 is connected to the regulator 210 through a feedback circuit 230 for detecting a current variation of the output of the transformer 220 and supplying the detected variation value to the voltage regulator 210 to generate a constant voltage fed into the primary of the transformer 220. At the output terminals T3, T4 and T5 of the secondary of the transformer 220, the operating voltage supplied to the regulator 210, the microcomputer 250, and heater of the color display tube 290 are produced respectively.

Also, a switching circuit 240 is provided in the power supply line provided between the output terminal T5 of the transformer 220 and the heater of the color display tube 290. A microcomputer 250 is provided to operate in response to a video input signal supplied from an input port 270 of the monitor to generated a control signal PS and a mode indicating signal MS.

Further, a mode indicator 260 is provided for indicating the operating mode of the monitor in response to the power control signal PS and the mode indicating signal MS supplied from the microcomputer 250. Finally, a signal amplifier 280 is connected with to input port 270 to amplify the input video signal and to process color picture signals supplied to a signal input of the color display tube.

When the HSYNC and VSYNC signals are not supplied to the video input port 270 and the monitor enters the power-off mode, the microcomputer 250 generates a high level control signal PS supplied to the switching circuit 240 and the mode indicator 260. At a normal state other than during the power-off mode, the control signal PS has a low level.

Also, as previously mentioned, the mode indicating signal MS generated by the microcomputer 250 corresponds to the standard LED display mode, established by VESA. For example, in this embodiment, the MS signal for the power-off mode is represented by continuous pulse signal train having a predetermined on/off pulse duration, and once this MS signal and the high level control signal PS are supplied to the mode indicator 260, the requirement that only an orange colored LED toggles on and off to represent the OFF mode will be satisfied.

Figure 3:
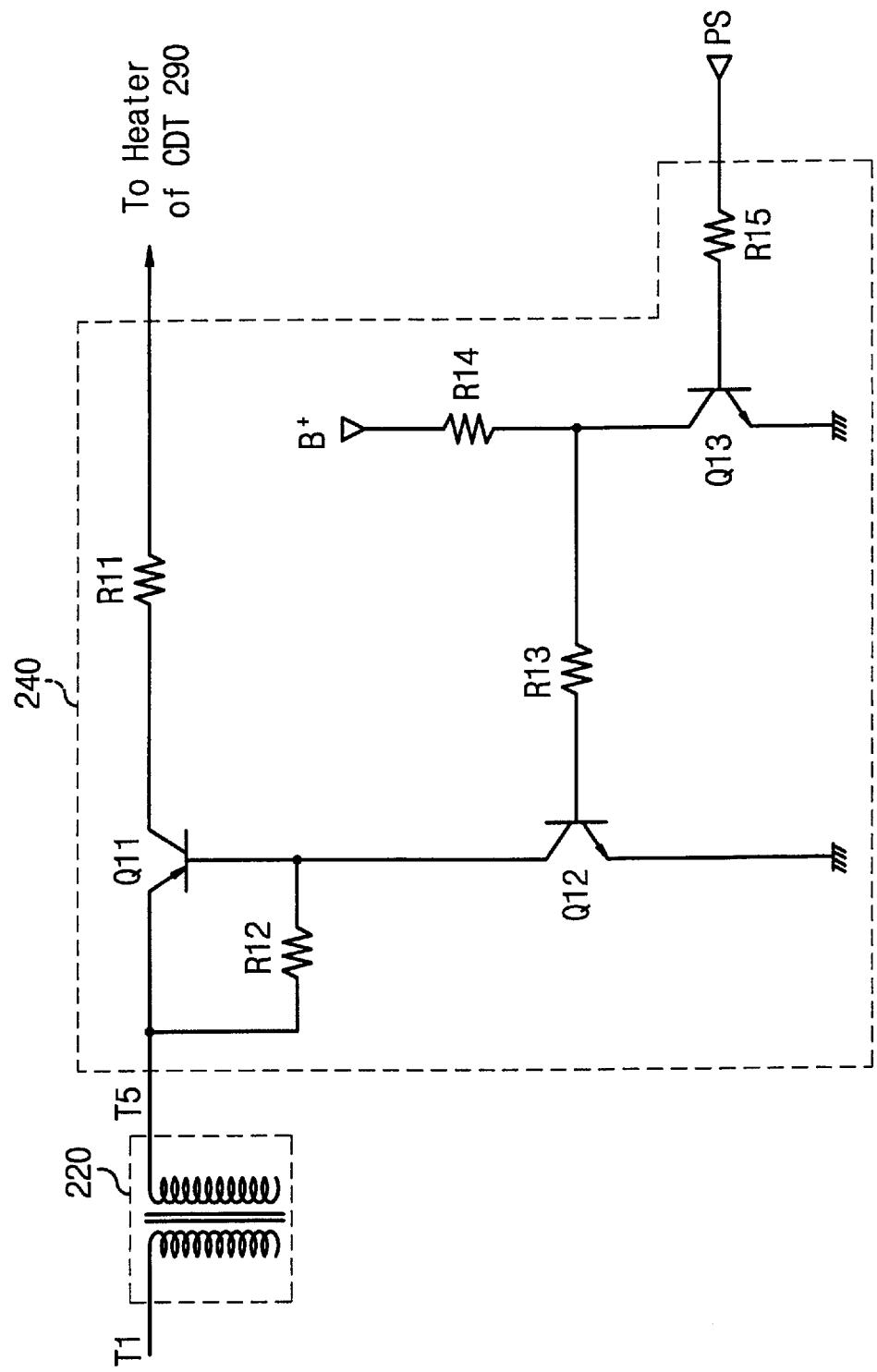
FIG. 3 is a detailed diagram of the switching circuit of FIG. 2.

Turning to FIG. 3, there is shown a detailed circuit diagram of the switching circuit 240. The output terminal T5 of the transformer 220 is connected to one input of the switching circuit 240 surrounded by dashed line. Another input of the switching circuit 240 is connected to the signal input line supplied with the power control signal PS. The output terminal of the switching circuit 240 is connected to the heater of the color display tube 290.

The switching circuit 240 includes switching transistors Q11, Q12 and Q13 with their biasing resistors R12, R13, and R15. More specifically, the emitter of the transistor Q11 is connected to the output terminal T5 of the transformer 220 and the collector of Q11 is connected to the heater of color display tube 290 through a resistor R11. Also, the base of Q11 is connected to the emitter thereof via the resistor 12 and to the collector of the transistor Q12. The base of Q12 is connected to the collector of transistor Q13 via the resistor R13 and the base of Q13 is connected to the power control signal input port PS via the resistor R15. The collector of Q13 is connected to an operating voltage supply terminal via a resistor R14, and the emitter of each transistor Q12 and Q13 are grounded.

In a normal state other than the power-off mode, the signal input line is not supplied with a high level control signal PS and is maintained at a low level. Then, the transistor Q13 is turned off and the transistor Q12 is turned on. Further, the transistor Q11 is turned on because the base bias current flows through the resistor R12 and the transistor Q12. Thus, the output power produced at the output T5 of the transformer 220 is supplied to the heater of the color display tube 290 via the transistor Q11.

However, when the signal input line is supplied with the high-level control signal PS, in the power-off mode, the transistor Q13 will be turned on, and the transistor Q12 turned off. The transistor Q11 is turned off because of disappearing the base bias current through the resistor R12. Thus, the output power of transformer 220 supplied to the heater of the color display tube 290 is interrupted by the transistor Q11.

Consequently, the switching circuit 240 can switch off the power supply line provided between the output T5 of the transformer 220 and the heater of the color display tube 290 while the high level control signal PS is being supplied.

Figure 4:
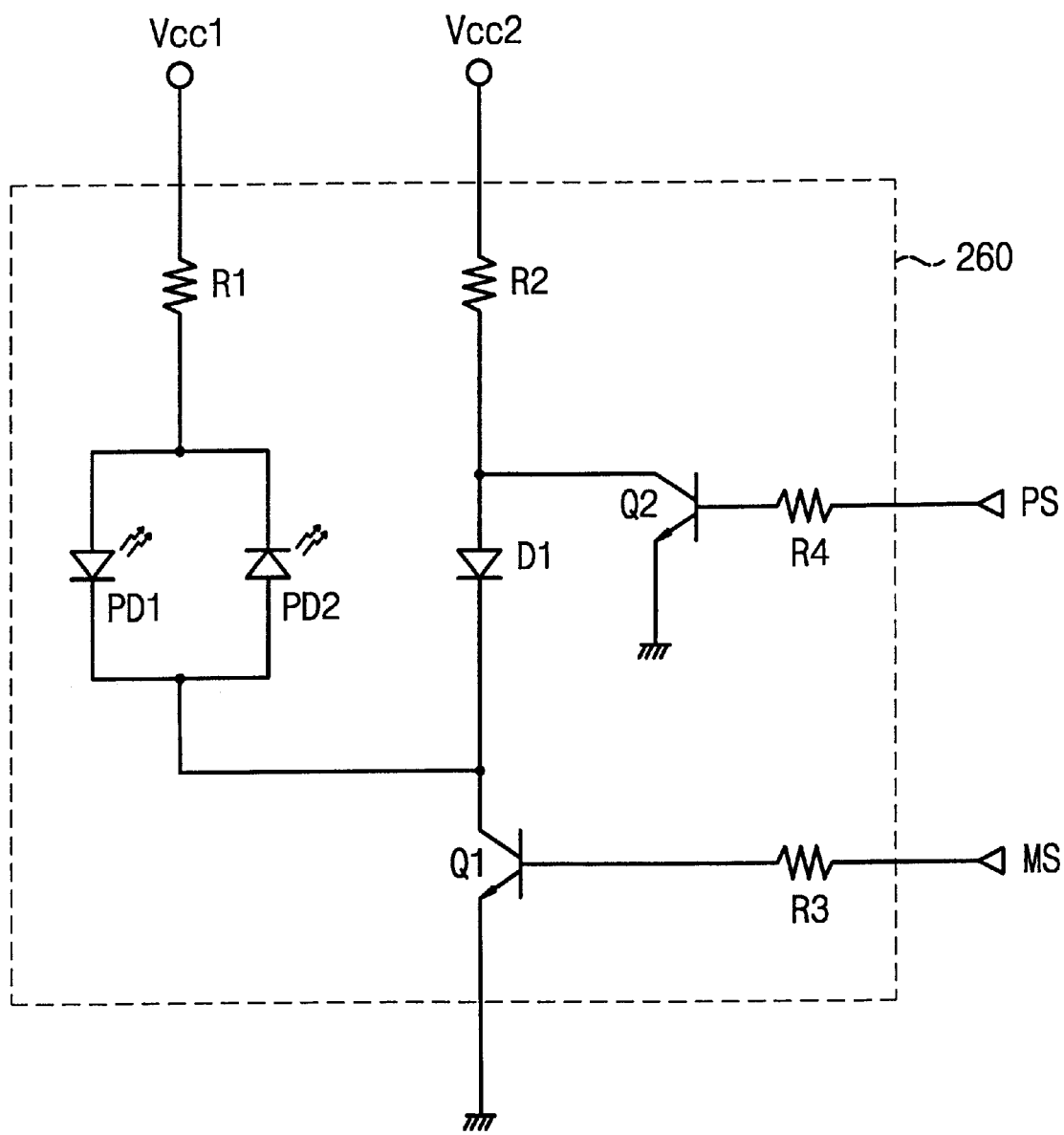
FIG. 4 is a detailed diagram of the mode indicator shown in FIG. 2.

Meanwhile, there is shown at FIG. 4 a detailed circuit diagram of the mode indicator 260 in accordance with the present invention. In FIG. 4, a pair of light emitting diodes (LEDs) PD1 and PD2 are provided within the mode indicator 260. The LEDs are connected in parallel with reversed polarity. Preferably, the LED PD1 is orange colored, and the LED PD2 green colored.

One end of LEDs PD1 and PD2 are both connected to of a first operating voltage Vcc1 through a resistor R1 and the other end of LEDs PD1 and PD2 are both connected to the collector of a switching transistor Q1. This collector of transistor Q1 is connected to a second operating voltage Vcc2 through a diode D1 and a resistor R2. The diode D1 is connected such that the current flows from the Vcc2 input to the collector of the transistor Q1. The potential of the second operating voltage Vcc2 is higher than that of the first operating voltage Vcc1.

The junction between the resistor R2 and the diode D1 is connected to a collector of a switching transistor Q2, whose base is connected to the control signal input terminal PS through a resistor R4. Also, the base of the transistor Q1 is connected to the mode indicating signal input terminal MS through a resistor R3. Finally, the emitters of transistors Q1 and Q2 are both grounded.

In operation, provided that the monitor is in the power-off mode, the high level control signal PS is supplied to the mode indicator 260 with the mode indicating signal MS represented by a continuous pulse train having a predetermined on/off pulse duration. The high level control signal PS allows the transistor Q2 to turn on and the Vcc2 voltage is connected to ground through the resistor R2. Also, the continuous pulse signal MS permits the transistor Q1 and the LED PD1 to turn on during the high level duration of the pulse MS, forming a the current path from the first operating voltage input Vcc1 to ground through the resistor R1 and the LED PD1. Thus, the LED PD1 is periodically turned on during the high level duration of the mode indicating signal MS while the high level control signal PS is supplied to the mode indicator 260.

As the LED PD1 is orange colored, the periodic turn on/off thereof can represent the power-off operation mode of the monitor according to the DPMS system.

As apparent from the above description, since the apparatus of this invention directly controls the power supply line directed to the heater of the color display tube by using the switching circuit 240, it can simplify the configuration of the power supplying section of the monitor without provision of the auxiliary power supplying unit for producing back up voltages for the regulator and the microcomputer. Thus, a reducing manufacturing cost of the power management control apparatus is possible. Also, by supplying the high-level control signal PS to the mode indicator 260 at the time of power-off mode, when the corresponding mode indicating signal MS consists of a continuous pulse train having a predetermined on/off pulse duration, the power-off mode indicating operation using one LED is possible.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for controlling the power management of a display monitor, said apparatus comprising:

a power supply unit for converting an AC input voltage to a DC output voltage;

a voltage regulator for producing a constant output voltage supplied to the monitor;

a transformer for producing necessary operating voltages for each part of the monitor, in which the output voltage of the voltage regulator being supplied to a primary of the transformer;

a feedback circuit for detecting current variation at the output of the transformer and for supplying the detected variation value to the voltage regulator;

a switching circuit provided in a heater power supply line between one output of the transformer and a heater of a color display tube of the monitor for switching off the heater power supply line when the monitor enters a power-off mode;

a microcomputer operated in response to a video signal received at a video input port of the monitor to produce a power control signal and a corresponding control mode indicating signal;

a signal input port connected to a video output of a computer; and a signal amplifier for amplifying and processing a video input signal supplied to a signal input of the color display tube.

2. The apparatus according to claim 1, the switching circuit including:

a first transistor for switching on or off the heater power supply line between one output of the transformer and the heater of the color display tube in response to a base bias current supplied from said output of the transformer;

a second transistor for selectively switching a base bias current path of the first transistor to ground; and a third transistor for selectively switching a operating voltage supply line to a base bias resistor of the second transistor or to ground in response to the level of the power control signal supplied from the microcomputer.

3. The apparatus according to claim 1, the microcomputer generating a continuous high level signal as the power control signal when the monitor enters the power-off mode.

4. The apparatus according to claim 1, the microcomputer generating the mode indicating signal consisting of a continuous pulse train signal having a predetermined on/off pulse duration, when the monitor enters the power-off mode.

5. The apparatus according to claim 1, further comprising a mode indicator for indicating the power control mode of the monitor in response to the power control signal and the mode indicating signal, the mode indicator comprising:

a first voltage supply for operating a first light emitting diode (LED);

a second voltage supply for operating a second LED;

a first switching transistor operated in response to the mode indicating signal generated by the microcomputer for switching on or off a first voltage supply line including the first LED to ground; and a second switching transistor operated in response to the power control signal generated by the microcomputer for switching a second voltage supply line to ground; said second voltage supply being connected to said first voltage supply through a series combination of a diode and the second LED.

6. The apparatus according to claim 5, the first voltage being lower than the second voltage.

7. An apparatus for controlling the power management of a display monitor having a color display tube, said apparatus comprising:

a power supply means for supplying power to the monitor including supplying a heater voltage to a heater of the color display tube;

a switching circuit disposed between said power supply means and said heater of the color display tube for selectively switching off the voltage to said heater when the monitor enters a power-off mode; and a control means connected to said switching circuit and receiving a video signal at a video input port of the monitor and for producing a power control signal in response thereto for controlling said switching circuit.

8. The apparatus according to claim 7, further comprising a mode indicator for indicating the power control mode of the monitor; and said control means further producing a control mode indicating signal in response to said video signal, said mode indicator being connected to said control means and indicating the power control mode of the monitor in response to said power control signal and mode indicating signal generated by said control means.

9. A method of controlling the power utilized by a display monitor having a color display tube, said method comprising:

provide necessary operating voltages to the monitor including a heater voltage for supplying a heater of the color display tube of the monitor;

receiving a video signal at a video input port of the monitor and generating a power control signal in response thereto; and selectively switching off the heater voltage to the heater of the color display tube in response to the power control signal.

10. The method according to claim 9, further comprising the step of providing a mode indicator for indicating the power control mode of the monitor;

generating a control mode indicating signal in response to the video signal received at the video input port of the monitor; and the mode indicator indicating the power control mode of the monitor in response to the generated power control signal and mode indicating signal.

* * * * *